(12) United States Patent
Bermejo Sotillo et al.

(10) Patent No.: US 9,034,100 B2
(45) Date of Patent: May 19, 2015

(54) CO₂-CAPTURING BINDER, PRODUCTION METHOD THEREOF BASED ON THE SELECTION, PURIFICATION AND OPTIMISATION OF CARBIDE LIME, AND AGGLOMERATES HAVING AN ENVIRONMENTAL ACTIVITY

(75) Inventors: Miguel Angel Bermejo Sotillo, Zamora (ES); Carlos Rodriguez Navarro, Granada (ES); Encarnación Ruiz Agudo, Alfacar (ES); Kerstin Elert, Granada (ES)

(73) Assignee: GEOSILEX TRENZA METAL, S.L., Madrid (ES)

( * ) Notice: Subject to any disclaimer, the term of this patent is extended or adjusted under 35 U.S.C. 154(b) by 216 days.

(21) Appl. No.: 13/496,363

(22) PCT Filed: May 4, 2010

(86) PCT No.: PCT/ES2010/070294
§ 371 (c)(1),
(2), (4) Date: Mar. 15, 2012

(87) PCT Pub. No.: WO2011/107629
PCT Pub. Date: Sep. 9, 2011

(65) Prior Publication Data
US 2013/0112115 A1 May 9, 2013

(51) Int. Cl.
| | | |
|---|---|---|
| C04B 2/02 | (2006.01) | |
| C01F 1/00 | (2006.01) | |
| C01F 11/02 | (2006.01) | |
| C04B 28/10 | (2006.01) | |
| B01D 53/62 | (2006.01) | |
| C01F 11/18 | (2006.01) | |
| C04B 2/00 | (2006.01) | |
| C01F 11/16 | (2006.01) | |
| C09D 1/10 | (2006.01) | |
| C04B 111/00 | (2006.01) | |
| C04B 111/72 | (2006.01) | |

(52) U.S. Cl.
CPC ............... C04B 28/10 (2013.01); B01D 53/62 (2013.01); B01D 2251/404 (2013.01); B01D 2251/604 (2013.01); B01D 2257/504 (2013.01); C01F 11/18 (2013.01); C04B 2/005 (2013.01); C04B 2111/00017 (2013.01); C04B 2111/00482 (2013.01); C04B 2111/00732 (2013.01); C04B 2111/72 (2013.01); Y02C 10/04 (2013.01); C01F 11/02 (2013.01); C01F 11/16 (2013.01); C09D 1/10 (2013.01)

(58) Field of Classification Search
CPC .............. C04B 2/02; C01F 1/00; C01F 11/02
USPC ........... 106/792; 252/184, 189; 423/164, 155; 585/534
See application file for complete search history.

(56) References Cited

U.S. PATENT DOCUMENTS

| | | | | |
|---|---|---|---|---|
| 2,595,255 | A * | 5/1952 | Holder | 585/408 |
| 2,692,815 | A * | 10/1954 | Walter | 423/215.5 |
| 3,498,767 | A * | 3/1970 | Foster | 48/38 |
| 3,664,134 | A * | 5/1972 | Seitz | 60/274 |
| 4,147,755 | A * | 4/1979 | Gogineni et al. | 423/243.05 |

\* cited by examiner

*Primary Examiner* — Timothy Vanoy
(74) *Attorney, Agent, or Firm* — Porzio, Bromberg & Newman, P.C.

(57) ABSTRACT

The invention relates to $CO_2$ capturing binder with an amortized environmental cost, the method of manufacture thereof by means of selecting, purifying and optimizing the carbide lime paste for use as a cementing material, and aggregates for the manufacture of lime paints and slurries, stuccos, mortars and concretes having multiple applications in the construction industry, in architectural restoration, in public works and land conditioning, object of the present invention. It is basically characterized in that the raw material is the residue in the form of sludge generated in the industrial manufacture of acetylene ($C_2H_2$) from calcium carbide ($CaC_2$) the fundamental component of which is calcium hydroxide ($Ca(OH)_2$) in highly reactive nanometric formations treated in a specific manner according to the invention.

45 Claims, 4 Drawing Sheets

US 9,034,100 B2

CO₂-CAPTURING BINDER, PRODUCTION METHOD THEREOF BASED ON THE SELECTION, PURIFICATION AND OPTIMISATION OF CARBIDE LIME, AND AGGLOMERATES HAVING AN ENVIRONMENTAL ACTIVITY

CROSS REFERENCE TO RELATED APPLICATION

This is a National Stage of International Application No. PCT/ES2010/070294, filed 4 May 2010, the disclosure of which Application is incorporated by reference herein.

FIELD AND OBJECT OF THE INVENTION

The object of the invention is a $CO_2$ capturing binder, with an amortized environmental cost, the method of manufacture thereof by means of purifying and optimizing carbide lime paste selected for use as a cementing material, and aggregates for the manufacture of lime paints and slurries, stuccos, mortars and concretes having multiple applications in the construction industry, in architectural restoration, in public works and land conditioning.

The binder object of the present invention is basically characterized in that the raw material is a selected residue in the form of sludge generated in the industrial manufacture of acetylene ($C_2H_2$) from calcium carbide ($CaC_2$) the fundamental component of which is calcium hydroxide ($Ca(OH)_2$) in highly reactive nanometric formations treated in a specific manner according to the invention for: (1) neutralizing the penalizing effect of impurities due to the presence of sulfides, sulfites and sulfates, as well as heavy metals (contaminants) by means of oxidation and treatment with $Ba(OH)_2$ and anhydrous barium sulfate (highly insoluble) co-precipitation; (2) eliminating the presence of organic carbon residues penalizing the reactivity of carbide lime in contact with silica and alumino-silicates by means of the aforementioned oxidation process; (3) enhancing pozzolanic hydraulic reactions; (4) maintaining the ambient $CO_2$ capturing capacity and air-setting capacity (carbonation); and (5) preserving the ease of the particles to produce agglomerations with a very consistent three-dimensional microstructure for the purpose of obtaining a material with cementing functions for the formation of aggregates with the capacity for capturing unhealthy gases that are harmful for the environment, produced virtually without energy or environmental cost.

BACKGROUND OF THE INVENTION

The study and application of materials containing residues derived from different types of industries in public works and construction is one of the technological and research fields which have advanced the most in recent years. In fact there is an entire new generation of cementing materials for use in construction and public works based on recycling silica/alumina-rich residues such as silica fume and fly ash, among others. On the other hand, in recent years a clear tendency towards the development and application of construction materials involving a minimum energy cost and a minimum contaminant emission in their manufacture while at the same time being, as an added value, materials compatibles with the environment, or at best, materials which contribute to overcoming pressing problems such as the emission of greenhouse or toxic gases, has been observed. In this sense, lime ($Ca(OH)_2$) is a very powerful cementing material since in addition to being compatible with the great majority of factory items (stone, brick, etc.), its hardening entails capturing atmospheric $CO_2$.

Residues generated in the manufacture of acetylene from calcium carbide have been used from the beginning of the existence of these residues in the treatment of agriculture and gardening lands, in the bacterial inerting of sewage water and wastes and in the preparation of concretes and mortars for direct use in construction works or for the manufacture of pre-manufactured elements.

Some known inventions use these residues for the manufacture of different products applicable in the construction industry but none has the object of applying the residues in capturing gases or optimizing carbide lime characteristics to prevent the problems which the impurities of the latter cause, which has prevented the widespread use of this residue. Said optimization of carbide limes allows producing a cementing material specialized in the reduction and storage of greenhouse gases, an aspect not claimed in any known invention. Nor do inventions relating to carbide limes determine, like in this invention, the physical characterization of the residues, the form of preservation and transport and the manufacturing conditions and they therefore also do not even mention, claim or establish the means to achieve that objective.

There are also many studies and ample knowledge on the properties of the calcium hydroxide as a chemical compound, on slaked limes, hydraulic limes, and commercial air limes, but there are no in-depth studies of the residual sludges from the manufacture of acetylene from calcium carbide in terms of the characterization of its hydraulic and air reactivity and its carbonation kinetics aimed at using this residue as a construction material characterized by its $CO_2$ absorbing environmental activity. Although there are some partial studies on physicochemical characteristics of carbide limes and on their pozzolanic activity or application as a cementing material, they always relate to non-optimized limes (without removing impurities). As indicated in this specification, there is no study on the effects of the process for optimizing lime proposed herein.

The documents found which could be pointed out as the relevant background for the discussion of the novelty of the invention are the following:

FR561352 (THOMMELIN, M.A-II), Aug. 3, 1923, which claims the use of residual limes from acetylene production in the manufacture of blocks for construction. They in no case propose the purification and optimization of carbide lime properties or its applications as a $CO_2$ capturing material.

In the same manner, but by using carbide lime and other residual limes (for example, from the sugar-making industry) FR714380 (VERNEY, H-J-M.), Jul. 24, 1930, proposes the mixture with pozzolans to obtain a construction material with hydraulic properties. Similarly to the case discussed above, it does not propose, in any case, the purification and optimization of carbide lime paste or its exploitation as a cementing material for capturing greenhouse gases.

U.S. Pat. No. 1,635,212 (PREST-O-LITE Company, New Cork; Herrly, C. J.) Jul. 12, 1927, which claims the use of mixtures of carbide lime with cellulose and silicates for the manufacture of blocks which can be used in construction once calcined at temperatures of up to 700° C. It does not claim, in any case, the prior treatment and purification of carbide lime. The heating of the blocks to obtain the final product is not compatible with that described herein since in addition to the costs which it involves, it generates a significant volume of $CO_2$ emission.

CH 237 590 A (DICKMANN MAX [CH]) 15 May 1945 (1945-05-15). It claims the use of residual sludges formed mainly by the calcium hydroxide (Ca(OH)$_2$) which is generated in the chemical industries using calcium carbide (CaC$_2$)+water (H$_2$O) to manufacture acetylene (C$_2$H$_2$) gas in construction. It does not however propose any type of purification or optimization of the product prior to its use as a cementing material, nor does it describe any type of specific process for processing the carbide lime, storage, prevention of carbonation, or applications as a CO$_2$ capturing element, use in preserving the artistic historical heritage, and it omits or ignores the irreversible aggregation properties of the residues used by the invention and does not assess the optimization of its hydraulic reactivity with respect to pozzolans. In summary, the use of residual limes is proposed simply for lowering costs and, as it does not attribute high cementing capacity to it, the use of other related materials from hydraulic cementing, such as hydraulic limes, cements and slag, is proposed to obtain quick setting and to increase the mechanical properties.

WO 99/18151 A (REBASE PRODUCTS INC [CA]; LILLEY MARTIN J [CA]; MEADE D MARK [CA]; MOR) 15 Apr. 1999 (1999-04-15), which claims the use of residues from calcium carbide as part of a compound based on any thermoplastic polymer which can further include any additive of those commonly used in the thermoplastic polymer transformation industry. It does not mention, in any case, the purification of these residues or their cementing function or the manufacture of mortars and concretes characterized by the mixture of cementing minerals, aggregates and water, and it also does not mention the use thereof in the construction industry.

Al-Khaja, W. A. (Engineering Journal of Qatar University, vol. 5, 1992, p. 57-67) and Al-Khaja, W. A. et al. (Resources Conservation and Recycling, 6, 1992, p. 179-190) studied the effects of the addition of carbide lime in the preparation of mortars (with and without Portland cement), observing that the mechanical performances thereof is slightly reduced when compared to mortars prepared with calcitic limes resulting from the calcination and hydration of limestones. However, the authors did not select or optimize or purify the carbide limes, as proposed in this invention, which, as has been discussed, could explain why the mortars with impure carbide limes have a worse mechanical behavior than those prepared with traditional calcitic limes.

On the other hand, the capacity of carbide limes (with impurities) for producing hydraulic cements once mixed with metakaolin and silica fume as described by Morsy, M. S (Ceramics-Silikáty, 49, 2005, p. 225-229) has been studied. However, the transformation rate of non-purified carbide lime is rather low, even after 28 days of reaction. The process of selecting, purifying and optimizing the carbide lime object of the present invention significantly improves the hydraulic reactivity of carbide lime as described in detail below.

Different methods of purifying carbide lime to thus enable appointing it for different industrial uses of high added value have also been proposed. These treatments described in EP1150919B1 (Of Pauw Gerlings, J & Hendrikus, M; CalciTech, 7 Nov. 2001), include: a) heating at 800° C., a high energy consumption and high economical cost method; b) filtration, a rather ineffective process in removing impurities which tends to present problems due to the small particle size of the carbide lime calcium hydroxide which blocks the filters; c) dissolving the carbide lime calcium hydroxide in water and separating the insoluble impurities. Such dissolution is performed in the absence (WO97/13723, Bunger et al., BUNGER AND ASSOCIATES, INC., 17 Apr. 1997; U.S. Pat. No. 5,846,500, Bunger et al., BUNGER AND ASSOCIATES, INC., 8 Dec. 1998; U.S. Pat. No. 5,997,833, Bunger et al., BUNGER AND ASSOCIATES, INC., 7 Dec. 1999) or in the presence of complexing agents and/or organic additives (EP1150919B1). In the first case, the volume of water needed is large given the low solubility of calcium hydroxide (its solubility product is $10^{-5.19}$; therefore its solubility at room temperature and pressure is about 2 g/l), which makes the use of this process in an economical manner difficult except in the cases in which the final product is of high added value (for example, in the manufacture of precipitated calcium carbonate for use in the paper industry). The addition of different types of complexing agents (for example, sorbitol or sucrose) increases the amount of Ca(OH)$_2$ dissolved in water (up to 70 g/l), therefore the process is more efficient (EP1150919B1), but its drawbacks include, first, the costs of the additives used, and second, the presence of the latter which can interfere in the subsequent use of the purified carbide lime solution. On the other hand, dissolving calcium hydroxide crystals entails the loss of all the physical and microstructural characteristics of carbide lime, characteristics which are, as described below, essential for the different applications of said lime as a binding material with hydraulic capacity in the presence of alumino-silicates and highly reactive in capturing CO$_2$ and other contaminating gases, this process producing an effect contrary to that sought in the present invention.

It therefore seems that the existing patents as well as the research work published up until now do not disclose or claim any of the aspects of the present invention.

Although the limes obtained both by traditional routes (limestone calcination and lime slaking) and by the latter route (carbide lime) are chemically formed by Ca(OH)$_2$ virtually at >80%, their properties (reactivity with respect to CO$_2$ or other gases such as SO$_2$ and NOx, binding and hardening capacity, rheology, reactivity with respect to pozzolans or other compounds with silica and alumina, among others) are largely conditioned by a series of parameters such as:

a) Crystal size and its distribution
   b) Crystalline morphology (habit)
   c) Degree of agglomeration, as well as aggregate morphology and size
   d) Specific surface area
   e) Concentration of water in a paste
   f) Content and type of impurities considering all these aspects, dry limes and lime pastes (with an excess of water) from the acetylene industry where the different parameters characterizing them are quantified have been studied. Emphasis has been placed on comparing the characteristics of the selected carbide limes with those calcitic limes manufactured by means of calcination and slaking (hydration) of limestone has been emphasized since these are more common in industrial applications and in construction. In this sense, the carbide lime generally has significantly better physical and microstructural properties than those of conventional calcitic limes, especially due to their reduced particle size, planar morphology, low aggregation tendency and large surface area. These characteristics make carbide limes very reactive with respect to gas (CO$_2$ and/or SO$_2$) fixation and with respect to hydraulic processes (great capacity for solubilizing silica and alumina and precipitating calcium silicate and aluminate hydrates).

The study conducted for the development of this invention has revealed that the selected residue which is generated in the manufacture of acetylene from calcium carbide, commonly referred to as lime, in spite of having a chemical composition very similar to traditional calcitic hydrated limes, has however, in addition to relevant impurities, unique physical properties distinguishing them from all other limes, giving it a different physicochemical characterization.

Said physicochemical characteristics are summarized in Table 1 where they are compared with the characteristics of a calcitic hydrated lime, representative of those produced by calcination and hydration of limestones.

TABLE 1

Physicochemical characteristics of the selected carbide lime and calcitic limes.

| Lime | Carbide lime | Calcitic lime |
|---|---|---|
| Percentage of solids (in the paste) | 0.25 | 0.39 |
| Surface area | 37 m2/g | 11.1 m2/g |
| Primary particle size | 5 to 100 nm | 100 to 200 nm |
| Mean aggregate size | 7 μm | 9-15 μm |
| Phases | | |
| Portlandite | 80% | 94% |
| Calcite | 6% | 5% |
| Others (calcium sulfite hydrate; alumino-silicate hydrates; inorganic and organic carbon) | 14% | 1% (alumino-silicates) |
| Composition (% by weight, except indication in ppm) | | |
| $SiO_2$ | 2.502 | 0.035 |
| $Al_2O_3$ | 1.264 | 0.019 |
| $Fe_2O_3$ | 0.093 | 0.02 |
| MgO | 0.105 | 0.28 |
| CaO | 69.614 | 76.006 |
| $Na_2O$ | 0.018 | 0 |
| $K_2O$ | 0.007 | 0 |
| $TiO_2$ | 0.025 | 0 |
| S (ppm) | 6238 | 36 |
| Cl (ppm) | 223 | 0 |
| Ni (ppm) | 27 | 0 |
| Cu (ppm) | 37 | 33 |
| Sr (ppm) | 158 | 59 |
| Zr (ppm) | 17 | 0 |
| Loss on calcination | 24.7 | 23.6 |

The results of the different analyses and tests carried out allow indicating the following conclusions with respect to the characteristics of the selected carbide lime, the use of some additives and the cementing material obtained from the optimized carbide lime, also an object of the invention:

The selected carbide lime has morphology, habit, particle size and degree of aggregation characteristics giving it a very large surface area. Said physico-structural characteristics suggest that it is a material with a high gas ($CO_2$ and $SO_2$) capturing capacity and favors pozzolanic reactions.

The selected carbide lime has a portlandite ($Ca(OH)_2$) crystal size typically less than 100 nm and generally in the range of 5-100 nm as the analyses by transmission electron microscopy demonstrate (FIG. 1a). The carbide lime is therefore a nanomaterial. The primary particle size is less than that of the calcitic air limes produced by calcination and hydration of limestone characterized between 100 and 200 nm.

The selected carbide limes have a low degree of aggregation, the aggregates formed being less than 10 μm in size, and generally between 2 and 8 μm (FIG. 1b). Furthermore, said aggregates are normally non-oriented particle aggregates and are therefore easily redispersible. In contrast, commercial calcitic air limes and particularly the more common lime powder typically include large aggregates (up to 20 μm) which tend to have oriented, therefore, irreversible aggregation. This gives them a relatively small surface area and, therefore, limited reactivity.

The small particle size and the low degree of aggregation thereof, as well as an eminently planar morphology of the hexagonal portlandite crystals in the selected carbide limes means that they have surface area values>30 $m^2$/g, occasionally close to 40 $m^2$/g, a value which doubles or even triples the surface area value of calcitic limes. Such a large surface area value indicates that the carbide lime will be extremely reactive.

The high reactivity thereof has, as an unwanted effect, an early carbonation during storage and transport if precautions are not taken (storage in perfectly hermetic containers).

The phases forming the selected carbide lime paste are: portlandite (≥80% by weight), with traces of calcite, carbonaceous particles (inorganic carbon, essentially graphite, and organic carbon (FIG. 1c), calcium sulfite hydrate (FIG. 1d) and calcium alumino-silicate hydrate. Furthermore, metals such as Ni, Cu, Sr and Zr are detected at concentrations which jointly exceed 200 ppm. The concentration of calcite increases during the drying of the lime paste (early carbonation) from values of 5 to 10% by weight to values of 20 to 25% by weight. Furthermore, said drying causes the oriented aggregation (irreversible) of the portlandite particles (which reduces their surface area). Therefore, in this invention, the use of dry carbide limes (powder) is rejected because the calcite in carbide limes would act as an inert material and because the oriented aggregation of portlandite crystals, result of said drying, reduces the reactivity.

Since carbide limes contain silica and alumina at concentrations ranging between 1 and 3% by weight, the presence of calcium alumino-silicate hydrate formed after solubilization of these compounds present in the selected carbide lime at high pH is detected. The existence of Ca in solution, result of dissolving the portlandite, finally brings about the precipitation of the calcium alumino-silicate hydrate. The presence of this alumino-silicate demonstrates that the selected carbide lime is slightly hydraulic, although it is not strictly a hydraulic lime.

The presence of impurities, especially organic carbon (in solution, in porous aggregates (FIG. 1c), and absorbed in the portlandite crystals), sulfides and heavy metals is a problem which has not been solved up until now and limits the industrial and technological use of such carbide limes which, on the other hand, have much better size, morphology and surface area characteristics than those of hydrated limes obtained by calcination and hydration of limestones.

These characteristics can vary according to the purity and quality of the original residues and the processing used during the manufacture of the calcium carbide. Low quality raw materials and processing translate into a low performance carbide lime. Thus for example, Cardoso et al. (Powder Technology, 2009, vol. 195, p. 143-148) describe low surface area (11.3 $m^2/g$) carbide limes having very reduced quality with an excess of graphite (5% by weight). The use of these low quality residues, although ruled out in this invention, is not recommended for the applications indicated herein. For this reason a study of the aforementioned parameters is essential to use and obtain a product having optimum performance by means of treatment according to the inventive method.

In the drawings attached:

The patent file contains at least one drawing executed in color. Copies of this patent or patent application publication with color drawing(s) will be provided by the Office upon request and payment of the necessary fee.

FIG. 1a depicts the transmission electronic microscopy analysis of the selected carbide lime with portlandite (Ca(OH)$_2$ crystal size typically less than 100 nm and generally in the range of 5-100 nm.

FIG. 1b depicts the microphotography showing the low degree of aggregation of the selected carbide limes, the size of aggregates formed being less than 10 μm and generally between 2 and 8 μm.

Figure 1A:
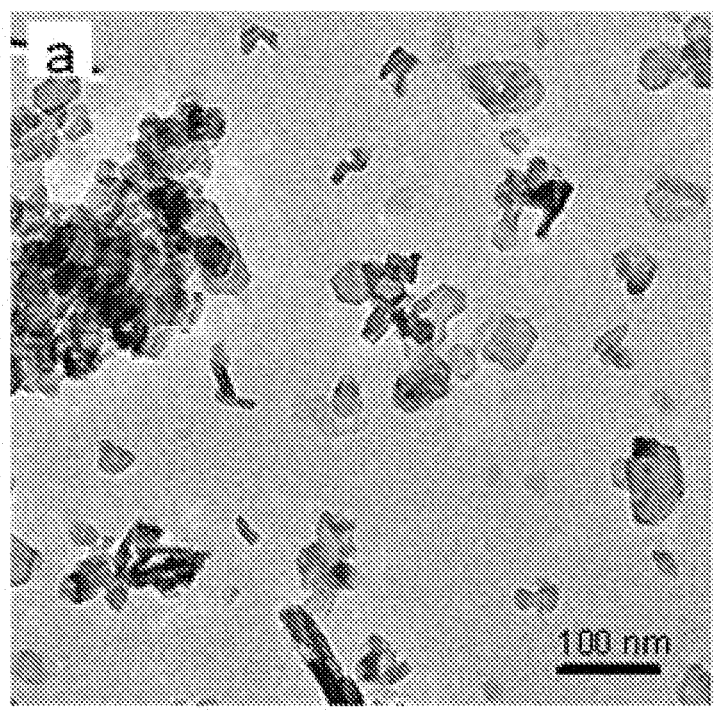
FIGS. 1c and 1d depict the microphotography showing the phases forming the selected carbide lime paste which are: portlandite (≥80% by weight) with traces of calcite, carbonaceous particles (inorganic carbon, essentially graphite, and organic carbon (1c), calcium sulfite hydrate (1d) and calcium alumino-silicate hydrate.
Figure 1B:
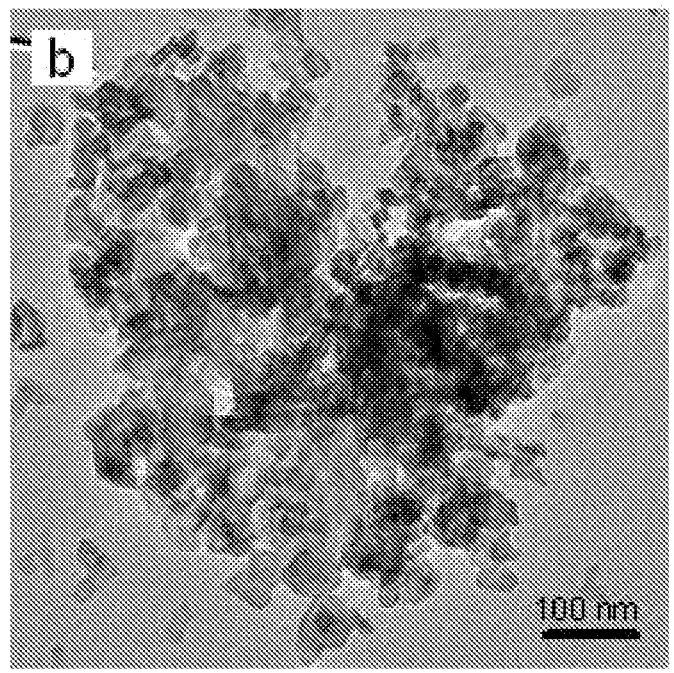

The invention relates to a method for treating carbide lime residues, ideally applicable to residues which preferably have the suitable initial properties in terms of relevant physico-chemicals characteristics, such as the case of those selected in the preliminary work of this invention, so that the products manufactured therewith have optimum performance, such that after the treatment they are not potentially toxic or they are not able to release contaminating elements (heavy metals) and gases (hydrogen sulfide), they do not release soluble sulfates which can cause the destruction of construction materials by crystallizing in the porous interior thereof, and at the same time, such carbide limes optimized and purified by the method of this invention have a high cementing capacity by air-setting primarily, although the setting can be hydraulic in the presence of pozzolanic materials, and so that they can meet the function of capturing ambient $CO_2$ and $SO_2$ (which is described in the earlier patent E 09380047.2 by TRENZAMETAL, S.L.).

Firstly, the method consists of the fact that from the moment the selected residues are removed from the acetylene generator to the moment of their incorporation in the mixtures for manufacturing the final products, they permanently maintain the calcium hydroxide contained therein, decanted in the original aqueous solution without contact with the air or vacuum-packaged in hermetically closed containers if the original water content is less than 25% of the total weight and preferably if it is less than 35% of the final weight. Thus the negative effects due, on one hand, to the early carbonation, and on the other, to the reduction of the lime reactivity due to drying and the subsequent oriented aggregation of the calcium hydroxide particles, are prevented.

Furthermore the oxidation treatment of the residues with hydrogen peroxide or another oxidizing reagent (for example, oxygen or mixtures of oxygen and nitrogen gases, among others), or bubbling with air in which the $CO_2$ has been previously removed, is incorporated. The process for producing air without $CO_2$ according to this invention consists of isolating the calcium hydroxide saturated solution, making up the supernatant liquid in the previously decanted carbide lime residues, in containers and subsequently using one of the following processes: 1) passing the air taken from the environment, bubbling it through the saturated solution contained in the containers; 2) passing the ambient air through a series of vertical curtains of the saturated solution; and 3) passing the air inside a tunnel through a cloud of the micronized solution. Said process allows oxidizing the sulfides from the impurities of the carbon used in the manufacture of calcium carbide, susceptible of generating hydrogen sulfide ($H_2S$) and sulfites until forming sulfates. The sulfur in a reducing medium (due to the presence of carbon residues giving the carbide lime a grayish hue) is hydrolyzed forming hydrogen sulfide and is subsequently oxidized forming sulfites (in an alkaline medium). The oxidation of sulfides and sulfites generates calcium sulfate which is subsequently treated according to the invention to form insoluble barium sulfate.

The oxidation treatment has significant effects on the cementing properties of the product since it also causes the oxidation of the organic carbon present in the carbide lime paste. Said organic matter inhibits the pozzolanic reactions which can take place upon mixing the carbide lime with different type of pozzolanic materials (metakaolin, slag, silica fume, fly ash, expanded glass, etc.) and other natural alumino-silicate materials such as clays. Such effect is achieved both by means of treatment with hydrogen peroxide or another oxidizing reagent (for example, oxygen or mixtures of oxygen and nitrogen gases, among others), and in a more economic and efficient manner by using air without $CO_2$ obtained by means of the method described in this invention.

The method for optimizing and purifying carbide limes also contemplates the addition of barium hydroxide for the fixation of heavy metals (fundamentally Sr, Cd, Cu, Pb, Ni, and Zn) and transformation of calcium sulfates (result of the oxidation of the sulfur compounds according to the method described above) into insoluble barite which, upon precipitating, incorporates said contaminating metals.

In the case of adding barium hydroxide in excess, the latter would reinforce the air-setting capacity of the carbide lime by transforming into very insoluble barium carbonate with high cementing power.

The material obtained after the treatment and optimization of the carbide lime as described in the inventive step which is object of the invention, acquires its full cementing capacity mixed with common soil minerals, especially the more reactive and abundant ones such as kaolinite and smectites, obtaining compact aggregates having sufficient strength not only for compacting soils but also for forming pavements, floors and surface courses in streets, roads and highways.

The high reactivity of the material obtained after the treatment and optimization of the carbide lime makes it especially ideal as a material of high hydraulic cementing potential once mixed with pozzolans. The tests performed demonstrate that the hydraulic reactivity of the carbide lime optimized according to the inventive method is greater than that of non-optimized carbide lime and much greater than that of traditional calcitic limes prepared by means of calcination and slaking of limestone.

Construction elements, whether pre-manufactured or made in situ, and generally products manufactured with the material object of this invention, during their service life, once their hydraulic setting reaction has ended in the event that pozzolans are added or it is applied to alumino-silicate materials (soils), while the air-setting process continues, are a very powerful $CO_2$ absorbent due to the continuous process for returning the calcium hydroxide ($Ca(OH)_2$) to its original natural mineral composition of calcite ($CaCO_3$) by means of the carbonation process according to the following reaction:

$$Ca(OH)_2 + CO_2 \rightarrow CaCO_3 + H_2O$$

The carbide lime optimized according to the inventive method do not present the drawbacks observed in the past in relation to the low strength of the non-optimized carbide lime-based constructive elements (mortars), such as described in the literature (Al-Khaja et al. 1992, Resources Conservation and Recycling 6, 179-190).

Likewise, the carbide limes optimized according to the method proposed in the inventive step show a greater pozzolanic reactivity than the mixtures of pozzolan (for example, metakaolin and silica fume) and carbide lime with impurities (untreated) used in the past (Morsy, 2005, Ceramics-Silikáty, 49, 225-229). After 10 days of setting, a mixture of optimized carbide lime and metakaolin/expanded silica in a proportion by weight of 0.75 (with a solids/water ratio of 0.66) cured at room temperature in an atmosphere of 93% relative humidity caused the complete consumption of the lime calcium hydroxide and the mass precipitation of calcium silicate and aluminate hydrates. Similar mixtures with carbide limes not optimized according to the inventive method proposed herein did not allow obtaining the complete consumption of the portlandite even after 28 days of setting (Morsy, 2005, op. cit.).

DESCRIPTION OF THE INVENTION

The studies conducted for this invention have discovered that despite the fact that certain residues from the manufacture of acetylene from calcium carbide do not strictly make up a hydraulic lime, they do have crystallization habits and morphology making them extraordinarily reactive both in solubilizing and capturing gases and with respect to alumino-silicates and pozzolans in the presence of water, resulting in very hard irreversible cementing aggregations of calcium carbonate and calcium aluminate and silicate hydrates (in the case of reaction with natural alumino-silicates and natural and artificial pozzolans) having high resistance to alteration processes.

The lime of the invention according to the inventive method described herein is a new purified and optimized cementing material giving it a high $CO_2$ capturing capacity and high hydraulic reactivity obtained from the selected residual sludges generated in the manufacture of acetylene from calcium carbide, which are optimized and purified according to the steps described below:

1.—Selecting the Residues

The residues have been selected according to the physical characteristics to classify them according to their reactivity potential with respect to capturing gases and hydraulic reactivity. Class B residues, the primary calcium hydroxide particles of which have sizes greater than 100 nm, are of interest for use as an air-setting binder with $CO_2$ capturing capacity. Class A residues with primary calcium hydroxide particles of sizes less than 100 nm further have a very high reactivity capable of carrying out the pozzolanic hydraulic reactions in the period of 28 days. The two classes of limes have air-setting, hydraulic-setting and $CO_2$ capturing capacity, but class A residues can also behave as a high performance hydraulic cementing binder, therefore, class A residues can be recommended as hydraulic binders and class B residues are not recommended as hydraulic binders.

2.—Collecting and Preserving the Residues

Since calcium hydroxide, and particularly class A and B residues from the manufacture of acetylene from calcium carbide are characterized by their instability, their properties can be modified or can even be taken away easily due to treatments and unsuitable handling.

Solid residues must be permanently kept in anaerobic conditions, completely isolated from contact with the ambient air, preserved from environmental reducing environments and in suspension in the original water in a quantity sufficient for preventing the oriented aggregation of the calcium hydroxide particles, such that a uniform layer of floating liquid is formed. In the event that the water contained in the residues is less than 35% by weight, they must be stored in airless vacuum-closed hermetic containers.

3.—Decanting and Collecting the Calcium Hydroxide Saturated Supernatant Solution The carbide lime generated in the industrial manufacture of acetylene, a process which typically implies the hydration of calcium carbide in an excess of water, forms a paste with a proportion of water ranging between 55 and 80% by weight, in which different solids are dispersed.

Most of the compounds present in the solution are decanted by gravity, producing a calcium hydroxide saturated supernatant liquid layer capable of contributing to the process for optimizing and purifying the lime. To that end, this supernatant solution must be collected, transferred and stored in specific containers by means of leak-tight ducts for the purpose of preventing aeration of the solution.

4.—Eliminating Impurities. Oxidizing Sulfides, Sulfites and Organic Carbon

The fraction of solids present in class A and B residues is essentially formed by $Ca(OH)_2$ particles (at concentrations ranging between 75 and 90% by weight), variables proportions of $CaCO_3$ (1 to 20% by weight; depending on the exposure to air thereof) and between 5 and 15% by weight of impurities (sulfides, sulfites and sulfates, inorganic carbon residues (graphite) and organic carbon residues, alumino-silicates and other inorganic impurities—heavy metals—), by-product of the calcined limestone and the carbon used in the manufacture of calcium carbide.

The impurities existing in carbide lime, in addition to being an impediment to its use in industry and in construction, can affect the reactivity of the limes. Thus, for example, the presence of organic carbon molecules which tend to be absorbed on the portlandite crystals, directly affects the hydraulic activity of said limes with respect to pozzolans. It has been necessary to that end to perform detailed microstructural studies to evaluate the modifications affecting the pozzolanic, carbonation, mechanical and durability properties of the cementing material object of the invention.

The sulfides and sulfites present in the carbide lime paste are removed according to the invention by means of oxidizing and transforming into sulfate (from calcium: gypsum) while the organic carbon of the carbide lime paste is oxidized. To that end different oxidizing products such as hydrogen peroxide ($H_2O_2$), pure gases (oxygen) or mixtures of gases (oxygen and nitrogen), or other oxidizing products (non-contaminating and which do no negatively interfere with the carbide lime composition and properties) can be used.

According to the invention, air can be used as a more economical and highly efficient alternative once bubbled through a calcium hydroxide saturated solution, or forced through a series of curtains of this solution, or also channeled through a tunnel of micronized saturated solution. Said solution is obtained according to step 3 after decanting the supernatant from the lime paste and/or from the filtering water of the carbide lime paste and is transferred to a deposit prepared for such purpose.

By means of this process, when the air $CO_2$ dissolves in the lime water, it is transformed into high pH (12.4) carbonates of said solution and when it reacts with the Ca present in the solution, it precipitates as calcium carbonate. The precipitated calcium carbonate (typically calcite scalenohedrons of micrometric size) can be used as an inert filler in the carbide lime aggregates themselves, in the paper industry, or in other high added value uses.

To assure the complete air $CO_2$ removal, bubbling the same in several calcium hydroxide saturated solution tanks (supernatant of the carbide lime paste) arranged in a sequential manner is proposed such that upon observing that the air coming from a bubbling tank no longer reacts with the lime water of the next tank (therefore not forming a calcium carbonate precipitate), said air from which all the $CO_2$ has been removed can be bubbled in the lime paste until completely oxidizing the sulfides and sulfites into sulfates, as well as oxidizing the organic carbon, without causing the carbonation of the carbide lime paste. During the bubbling it is convenient to remove the lime paste by mechanical means, thus facilitating the homogenous development of the oxidation reaction in the entire volume of carbide lime paste.

In the work performed for the development of the invention, a fraction of the carbide lime paste was treated with oxygenated water ($H_2O_2$), adding 10 ml of oxygenated water at 33% vol. for every 100 ml of lime paste, a constant bubbling being immediately observed. Such bubbling proves the presence of organic matter which, when oxidized, is transformed into $CO_2$, the gas responsible for the bubbling, together with the $O_2$ in excess. After 48 hours, the bubbling ceased and the unpleasant "rotten egg" odor typical of hydrogen sulfide, disappeared. The oxygenated water oxidized the organic carbon residues present in the paste, preventing the generation of the hydrogen sulfide by increasing the redox potential of the solution. This increase of the oxidation potential in the paste caused the oxidation of the sulfur residues, transforming them into sulfates.

Figure 1C:
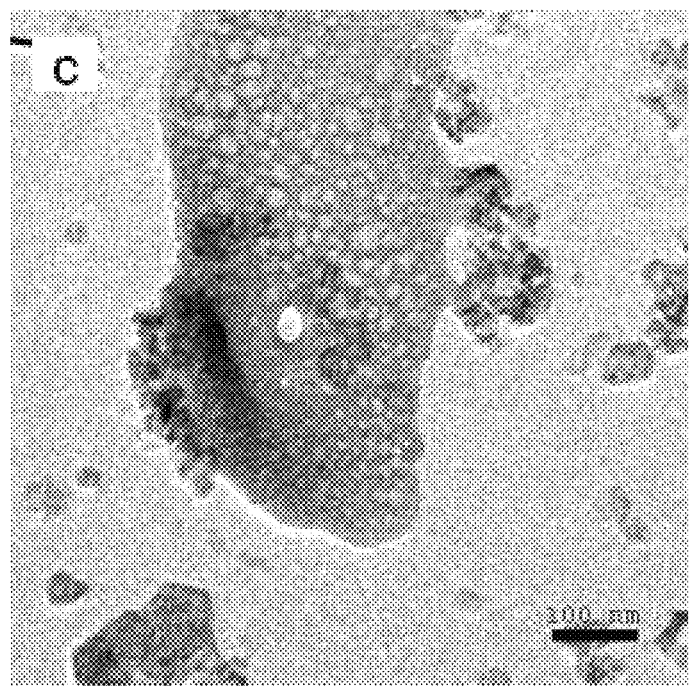
Figure 1D:
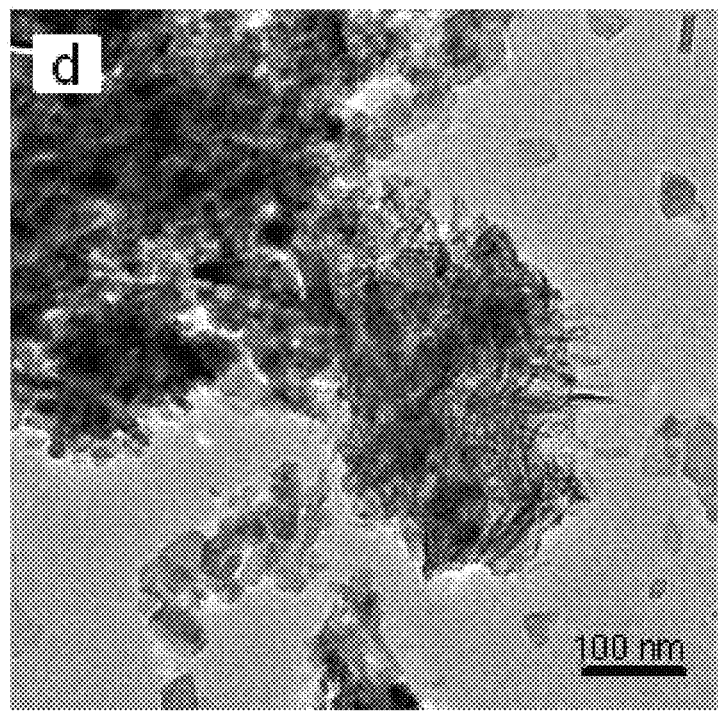

The X-ray diffraction analyses of the carbide limes treated according to the oxidation method described prove the disappearance of the sulfites and their transformation into sulfates while the amount of $CO_2$ released after oxidizing the organic matter absorbed in the portlandite crystals, and also present as porous organic carbon structures, does not generate a detectable early carbonation (±5% by weight of $CaCO_3$) are clearly shown. The $N_2$ absorption analyses at 77 K demonstrate that the carbide lime treated according to the oxidation method described does not experience a significant change in the particle size and the surface area thereof since this is only reduced from the values of 37 $m^2/g$ (before the treatment) to the values of 31 $m^2/g$; these values are much greater than those of conventional hydrated calcitic limes. Said reduction of the surface area value is precisely due to the oxidation and removal of organic carbon which, as clearly shown by the transmission electron microscopy studies, tends to form very porous structures (FIG. 1c).

As has been indicated, the hydrogen peroxide, (or another oxidizing component, gas or solid), or the air from which $CO_2$ has been removed, react by attacking the organic carbon residues present in the residues from carbon (coke) provided in calcium carbide production. This is a very positive action because it deactivates unwanted interactions in future reactions with other inorganic materials, essentially alumino-silicates, such as clays or other pozzolanic materials, which reactions are necessary for the hydraulic-setting of the material. It is known that the adsorption of different types of organic compounds on the surface of alumino-silicates, both pozzolanic materials (metakaolin) and clay minerals, deactivates them, making them resistant to treatments with a strong base ($Ca(OH)_2$, KOH or NaOH) (Claret et al., 2002 Clays and Clay Minerals 50, 633-646), therefore the development of hydraulic type reactions, which are important in the applications which are detailed below, is prevented. Such effect occurs even with concentrations of organic carbon much less than 1% by weight. On the other hand, the small amount of $CO_2$ generated after the oxidation of said traces of organic carbon do not produce a detectable early carbonation.

5.—Neutralizing the Negative Effects of Sulfates and Precipitating Toxic Elements Together with the previous treatment, it is necessary to eliminate the negative effects which the sulfates, essentially calcium sulfate hydrate (gypsum: $CaSO_4.2H_2O$), may have which, since it is a soluble salt (solubility product about $10^{-5}$), would generally penalize the use of carbide lime as a construction material and especially in architectural restoration interventions due to the fact that soluble sulfates can crystallize in the porous interior of construction or ornamental materials causing irreversible damages (alteration by salt crystallization). To that end, the lime paste is treated with barium hydroxide, which brings about the dissolution of the calcium sulfate and the subsequent precipitation of barium sulfate (barite, $BaSO_4$). Barium oxide is extremely insoluble (its solubility product is about $10^{-10}$, therefore it is 5 orders of magnitude more insoluble than gypsum), barium sulfate ultimately being an inert material. What is most interesting of this new method for fixing the sulfates of carbide lime is that barium oxide has a great capacity for co-precipitating heavy toxic elements (Zhu, C. 2004. Geochimica et Cosmochimica Acta, 68, 3327-3337) present in carbide lime. Their immobilization by incorporation in the structure of insoluble barium sulfate assures that these elements will not be leached in the future after applying the lime pastes in the different uses described herein. This means that carbide lime residues meet the existing restrictive environmental standards in terms of the presence of heavy metals in the environment. The amount of barium hydroxide to be added is equivalent in moles to that of sulfates present in the lime paste. Thus, for example, in the case of the carbide lime analyzed in FIG. 1 (see Table 1), having an amount of S of 0.6% by weight, it will be necessary to add an amount of 0.018 moles of $Ba(OH)_2$ for every 100 g of solids in the lime paste. If required, it is easy to remove the barium sulfate from the lime paste either by gravimetric separation methods or by simple decantation given the large density difference between portlandite (2.23 g/cm$^3$) and barium oxide (4.48 g/cm$^3$), or according to flotation methods (the surface charge of portlandite at pH 12.4 is +, whereas that of barium oxide is −). Said barium oxide can be used in different already known uses, including the uses thereof as pigment in paints or in ceramic enamels, or as filler in drilling muds.

If Ba hydroxide is added in excess, the effect can also be beneficial since, in addition to removing calcium sulfates, it precipitates barium carbonate together with the calcium carbonate formed during the carbonation and hardening of the optimized carbide lime-based construction materials. Barium carbonate has a lower solubility and a lower dissolving speed than calcite (the solubility product of $BaCO_3$—witherite—is $10^{-8.56}$; whereas that of calcite is $10^{-8.48}$) therefore it is more resistant to alteration phenomena and has a high cementing power (Lewin and Baer, 1974, Studies in Conservation, 19, 24-35).

6.—Filtering and Rheological Adaptation

After the accelerated oxidation of the residues with hydrogen peroxide (typically after 48 hours) or with air without $CO_2$, and exposed to the action of Ba hydroxide once the bubbling of $CO_2$ and of the excess $O_2$ ceases, the lime paste is transferred in leak-tight conditions to the filter press.

Once the cakes are extracted in a continuous operating condition, they are rehydrated and kneaded until the paste is rheologically adapted to the applications.

The paste obtained must maintain a moisture level above the saturation level because the particles keep absorbing water in the interstitial spaces for time periods exceeding six months. The plasticity of the material will depend on the degree of water absorption of the solution.

Kneading with the suitable amount of water is performed continuously and it is dried in hermetic big bags. The hydration process continues in these containers.

During their service life, the products manufactured with the lime object of this invention as a cementing component treated by means of the technique of the invention are a very powerful $CO_2$ absorbent due to the continuous process for returning calcium hydroxide ($Ca(OH)_2$) to its original natural stony calcium carbonate composition by means of the carbonation process whereby the following reaction takes place: $(Ca(OH)_2)+CO_2 \rightarrow (CO_3Ca)+H_2O$. This reaction occurs very effectively due to the high reactivity values of the final lime of the invention characterized by the specific porosity and surface area.

7.—Reactivity with Pozzolanic Elements

The elements of the class A carbide lime-based product optimized according to the method of the present invention has a greater hydraulic reactivity with respect to aluminosilicates (clays) and pozzolans (for example, metakaolin and mixtures of metakaolin and expanded silica microspheres) than non-optimized carbide limes. Said hydraulic reactivity is also greater than that of conventional calcitic limes produced by calcination and hydration of limestone. This allows the optimal application thereof with pozzolans and in the consolidation and stabilization of natural soils.

Figure 2:
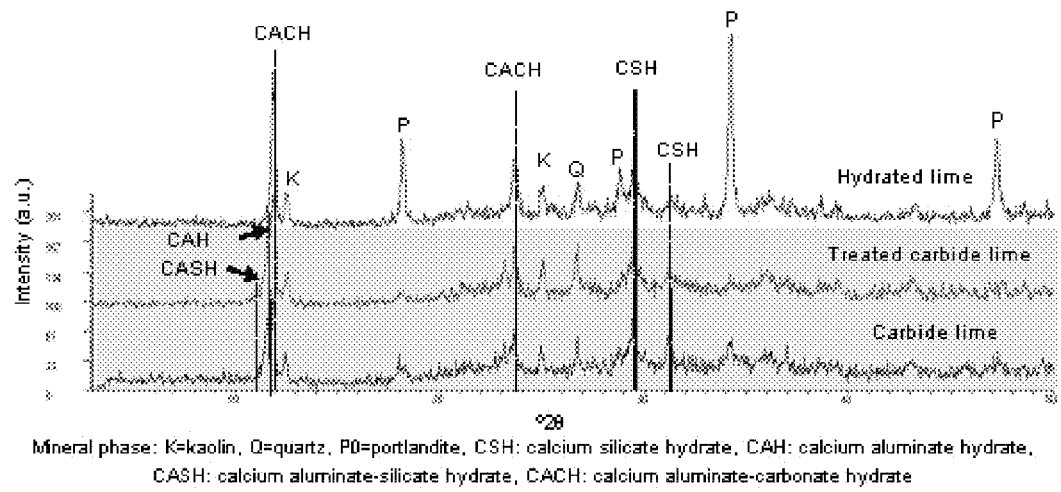
FIG. 2 depicts the X-ray diffraction analysis of mixtures with class A carbide limes non-optimized according to the inventive method proposed herein as comparison

Thus, class A carbide limes optimized according to the method proposed in the inventive step show greater pozzolanic reactivity than the mixtures of pozzolan (metakaolin and silice fume) and carbide lime with impurities (untreated) used in the past (Morsy, 2005, Ceramics-Silikáty, 49, 225-229). After 10 days of setting, a mixture of carbide lime treated and optimized according to the inventive method and metakaolin/expanded silica (commercial material called METAPOR: see composition in Table 2) in a lime/METAPOR proportion of 0.75 by weight and with a solids/water ratio of 0.66 by weight, cured at room temperature in an atmosphere of 93% relative humidity caused the complete consumption of the lime calcium hydroxide and the mass precipitation of calcium silicate and aluminate hydrates, as demonstrated by the X-ray diffraction analyses shown in FIG. 2.

TABLE 2

| METAPOR composition (% by weight) | |
| --- | --- |
| SiO2 | 51.55 |
| Al2O3 | 31.21 |
| Fe2O3 | 0.3374 |
| Cr2O3 | 0.0341 |
| TiO2 | 0.22 |
| MgO | 0.301 |
| CaO | 2.466 |
| MnO | 0.01 |
| BaO | 0.101 |
| PbO | 0.0617 |
| Na2O | 9.483 |
| K2O | 1.727 |
| P2O5 | 0.178 |
| SO3 | 0.037 |
| Cl | 0.014 |
| Loss on calcination | 2.18 |

Similar mixtures with class A carbide limes not optimized according to the inventive method proposed herein did not consume such an amount of portlandite after the same period of curing, the amount of calcium aluminate and silicate hydrates formed (FIG. 2) being less. The results of other investigators indicate that impure carbide limes do not consume all the calcium hydroxide, mixed with metakaolin and silica fume in proportions similar to those used herein, not even after 28 days of setting (Morsy, 2005, op. cit.). The same must be mentioned for the case of a mixture similar to the one described above in which commercial hydrated lime (the composition and physicochemical characteristics of which are shown in Table 1) is used. After 10 days of setting, a significant fraction of unreacted $Ca(OH)_2$ was detected by X-ray diffraction (FIG. 2) whereas the amount of calcium aluminate hydrates and calcium silicate hydrates was much less than in the case of the paste prepared with the carbide lime paste purified and optimized according to the present invention.

Figure 3:
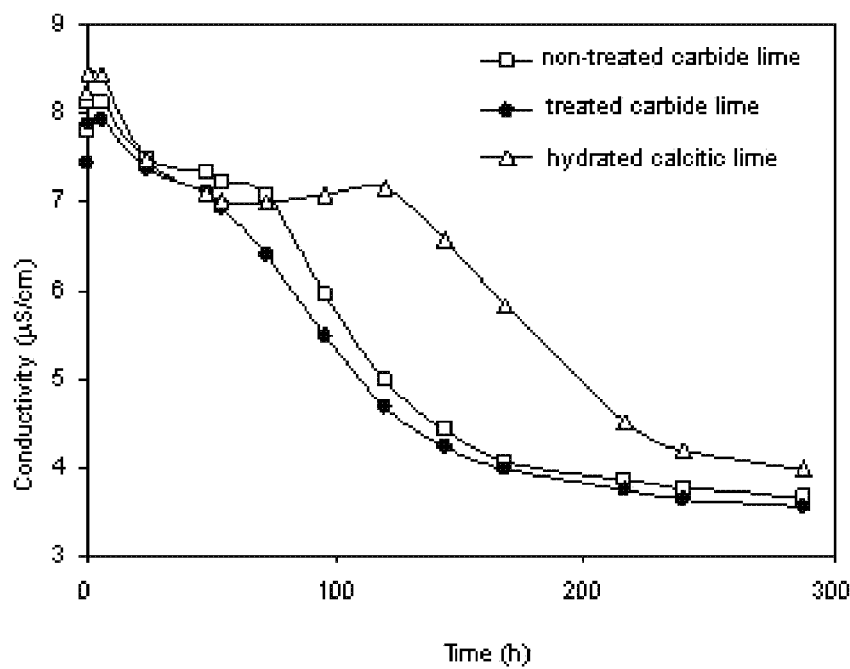
FIG. 3 depicts the pozzolanic reactivity of the class A carbide limes untreated, class A carbide lime treated according to the invention and conventional hydrated calcitic lime expressed as conductivity variation over time.

These results are consistent with pozzolanic reactivity measurements. The pozzolanic reactivity of a class A carbide lime suspension optimized according to the present invention in comparison with METAPOR was greater than that of non-optimized carbide lime and much greater than that of hydrated lime, as reflected by the larger conductivity variation (faster reduction) of said suspension (prepared by mixing 0.4 g of METAPOR and 0.4 g of $Ca(OH)_2$, of each type of lime in 100 ml of water, and maintaining it in hermetic containers in a water bath at 28° C.) over time (FIG. 3).

These results explain why non-optimized class A carbide limes used both in pozzolanic cements and in the case of Portland cement-based constructive elements (mortars) have, among other drawbacks, a lower strength than the same elements prepared with conventional hydrated limes (Al-Khaja et al. 1992, Resources Conservation and Recycling 6, 179-190).

In the event of wanting to prepare a cementing material with hydraulic setting capacity, the optimized class A carbide lime paste will be mixed with pozzolans. Ideally pozzolans formed by silicates and alumino-silicates of thermally treated or untreated residues will be used: metakaolin, silica fume, rice husk, fly ash, expanded glass, silica microspheres, etc.

According to the tests conducted, optimal results are obtained using mixtures of metakaolin and expanded glass (expanded silica microspheres) as the pozzolanic material in expanded glass/metakaolin proportions of 0.18. The amount of carbide lime treated according to the invention to be added to the mixture of lime and pozzolan will be up to 80% by weight (dry residue), the minimum amount of lime added being 55% by weight of the mixture to thus assure the complete reaction with the pozzolan described above.

8.—Alcoholic Dispersion

On the other hand it was observed that since class A carbide lime has an extremely small particle size, dispersions which are stable in alcohols such as propanol can be obtained. It is known that alcoholic dispersions of nanolimes (calcium hydroxide) synthesized homogenously (Baglioni, P., Dei, L., Ferroni, E. and Giorgi, R. Calcium hydroxide stable suspensions. Patent application IT/FI/96/A/000255, 1996; Baglioni, P., Dei, L., Giorgi, R. and Schettino, C.V. Basic Suspensions: Their Preparation and Use in Processes for Paper Deacidification. International patent PCT/EP02/00319, Jan. 15, 2002.) are effective in the preservation of historical heritage elements. However the synthesis thereof is complex and expensive.

Class A carbide lime optimized according to the methods described herein and applied in alcoholic dispersions would be an economical and efficient alternative to said nanolimes in restoration and preservation treatments.

9.—Rheological Additives

Some organic additives can modify the morphology and other textural aspects (habit and particle size, as well as the degree of aggregation) of calcium hydroxide crystals in a lime paste as well as those of calcium carbonate formed after carbonation.

Since the effectiveness of lignosulfonate as a fluidizer in conventional mortars is known, in studies prior to this invention tests were conducted which determined that due to its high molecular weight, this additive at concentrations greater than 1.5% isolates calcium hydroxide particles, preventing them from capturing $CO_2$ and therefore the setting thereof by carbonation. However, dosing in concentrations less than 1.5% by weight causes a significant reduction of the paste viscosity, which has beneficial effects in some applications (for example, extrusion of carbide lime-based elements). However, the presence of this additive (or another type of organic additive with fluidizing or dispersing properties) makes the hydraulic reactions between portlandite and alumino-silicates and other pozzolanic materials difficult. To that end and according to this invention, such additives are not used in applications in which optimized class A carbide limes are applied together with pozzolans or as a cementing material of alumino-silicate materials (soil clays).

10.—Interaction of Additives with NOx and Contaminating Hydrocarbon Residues

Mixtures incorporating optimized limes object of the invention, water, siliceous aggregates and pozzolans (metakaolin and silica microspheres) to which between 0.3% and 15% by weight of photocatalytic titanium dioxide (anatase) has been added as nanometric particles having sizes similar to those of the calcium hydroxide of the modified carbide lime have been tested and a good attachment of the particles of the latter material inside the hydraulic precipitates (calcium aluminate and silicate hydrates) produced has been confirmed, the titanium particles being exposed upon contact with the air due to the permeability given by the pores found in the aggregations.

Figure 4:
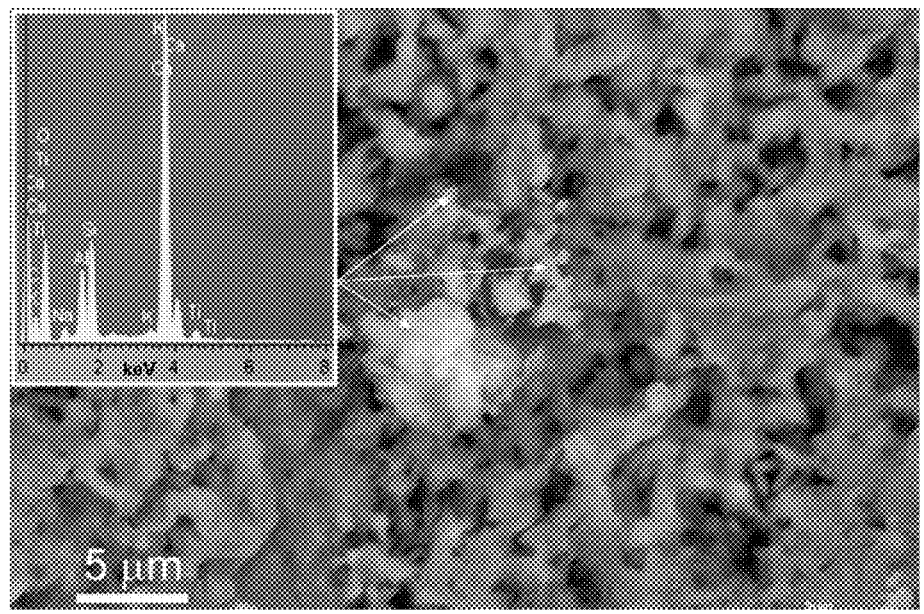
FIG. 4 depicts the SEM microphotography of class A carbide lime slurry optimized according to the inventive method mixed with METAPOR and with TiO$_2$ nanoparticles (anatase) and EDX microanalysis.

In fact, as seen in FIG. 4, in which an SEM microphotography of the class A carbide lime slurry optimized according to the inventive method mixed with METAPOR and with $TiO_2$ nanoparticles (anatase) is shown, the EDX microanalyses (spectrum inserted in FIG. 4) demonstrate that the $TiO_2$ particles are exposed on the surface of the pores while at the same time they are attached between the cementing microparticle mass of calcium silicate and aluminate hydrates and calcium hydroxides and calcite, forming a very porous matrix.

With respect to the efficacy of this photocatalytic system applicable to capturing by means of oxidizing contaminating gases such as NOx, it should be pointed out that the optimization of lime by removing organic carbon prevents interferences with the oxidation potential of titanium oxide.

11.—Capturing $CO_2$

Optimized carbide lime elements mixed with aggregates in fresh state (non-carbonated) show high porosity and low density. Furthermore, they are materials with a high water absorption coefficient. Its high porosity and the suitable existence of macropores and mesopores assured that the carbonation process can be relatively fast and homogenous, reaching the entire volume of the material.

Partially carbonated optimized carbide lime elements mixed with aggregates experience a reduction of the porosity and of the volume of pores having sizes less than 100 nm. This enhances the durability of such materials against alteration processes since in pores smaller than 100 nm dissolution phenomena and the damaging effects of salt crystallization or of ice formation would be favored.

Optimized limes have a greater $CO_2$ capturing capacity which is clearly shown in a fast reduction of the surface area thereof upon transforming $Ca(OH)_2$ nanoparticles into micrometric-sized $CaCO_3$ crystals (with a lower surface/volume ratio), which confirms the capturing of said gas.

The amount of $CO_2$ captured per Tm of dry treated carbide lime residue is 0.594 Tm, 1.35 Tm of calcium carbonate (calcite) being produced, which proves the enormous $CO_2$ capturing power of said residue.

Limes optimized according to the invention are in optimal conditions for capturing $CO_2$, producing at the same time a coherent carbonated cement with high crystallinity.

The synergy between the carbide lime selected, optimized and purified according to this invention and photocatalytic titanium dioxide characterizes these two materials as being ideal for construction and public work elements with positive environmental activity.

Having sufficiently described the nature of the invention it must hereby be stated that it is not limited to the exact details of this specification, but in contrast, modifications which are considered appropriate will be introduced therein provided that the essential features thereof which are claimed below are not altered.

The invention claimed is:

1. A $CO_2$ capturing binder comprising calcium hydroxide $(Ca(OH)_2)$ in a proportion greater than 75% by weight with respect to the total weight of the components, in primary nanometric formations having a size greater than 100 nm, with a specific surface area less than 30 m²/g obtained after selecting, purifying and optimizing class B carbide lime residues from the manufacture of acetylene from calcium carbide.

2. A $CO_2$ capturing binder comprising calcium hydroxide ($Ca(OH)_2$) in a proportion greater than 75% by weight with respect to the total weight of the components, in primary nanometric formations comprised between 5 nm and 100 nm, with a specific surface area of up to 31 $m^2/g$, having mainly disoriented aggregations of micrometric sizes which do not exceed 10 µm, the latter being a mesoporous material with pores in the form of a slit having an average diameter of 25 nm obtained after selecting, purifying and optimizing class A carbide lime residues from the manufacture of acetylene from calcium carbide.

3. A method for purifying and optimizing type B carbide limes of claim 1, wherein the natural degradation of the high reactive capacity of the calcium hydroxide ($Ca(OH)_2$) particles and the $CO_2$ absorption capacity by the step of transforming the calcium hydroxide ($Ca(OH)_2$) into calcium carbonate ($CaCO_3$) is blocked in a preventive manner keeping the residues permanently throughout all the phases of handling in colloidal solution or decanted in the original aqueous solution without contact with the ambient air, using as an isolator the layer of original water floating in the vessels where it is preserved or vacuum-packaged in hermetically closed containers.

4. The method for purifying and optimizing the carbide limes according to claim 3, wherein the calcium hydroxide saturated supernatant solution is removed, transferred and stored in containers connected to one another and to the purification system by means of hermetic ducts to prevent the premature carbonation by airing of the solution.

5. The method for purifying and optimizing the carbide limes according to claim 3, wherein given its capacity to form hydraulic cementing matrices due to the high reactivity associated with the large surface area of calcium hydroxide ($Ca(OH)_2$), the organic carbon present in the carbide lime paste is subjected to an accelerated oxidation process to prevent unwanted interactions in the future pozzolanic reactions.

6. The method according to claim 3, wherein given the presence of sulfides which can generate contaminating or harmful gases (hydrogen sulfide) and sulfites, an accelerated oxidation treatment is performed to transform them into sulfates.

7. The method according to claim 3, wherein the original residues have been exposed to oxidizing substances in ratios of attack equivalent to or greater than that corresponding to a treatment with 10 ml of oxygenated water (hydrogen peroxide ($H_2O_2$)) at 33% vol. for every 100 ml of original residue decanted in containers connected to one another and to the purification system.

8. The method according to claim 3, wherein the original residues have been exposed to an oxidation process by means of bubbling with air in which the $CO_2$ has been previously removed.

9. The method according to claim 3, wherein the air used for bubbling the residues has been in turn obtained by bubbling it through a calcium hydroxide saturated solution, obtained from the supernatant of the carbide limes previously decanted in containers connected to one another and arranged in a sequential manner, until the formation of calcium carbonate precipitate is not observed.

10. The method according to claim 3, wherein the air used for bubbling the residues has been in turn obtained by passing it through a continuous series of vertical curtains of a solution calcium hydroxide saturated solution, obtained from the supernatant of the carbide limes previously decanted in containers arranged in a sequential manner, until the formation of calcium carbonate precipitate is not observed.

11. The method according to claim 3, wherein the air used for bubbling the residues has been in turn obtained by passing it through a tunnel in which a series of sprinklers creates a cloud of micronized droplets of a calcium hydroxide saturated solution, obtained from the supernatant of the carbide limes previously decanted in containers arranged in a sequential manner, until the formation of calcium carbonate precipitate is not observed.

12. The method according to claim 3, wherein the original residues exposed to the oxidation process are treated with barium hydroxide at a concentration equimolar to that of sulfates existing in the carbide lime paste to form, from the sulfates, insoluble anhydride barium sulfate which incorporates and fixes the heavy metals existing in the carbide lime paste in its structure, preventing their future leaching.

13. The method according to claim 3, wherein the original residues are treated with an excess of barium hydroxide to favor the formation of cementing barium carbonate during the air-setting process.

14. A binder according to claim 1, wherein it is used for the formation of air and hydraulic cementing matrices with capacity for absorbing ambient $CO_2$ up to the equivalent to 59.4% of the weight of the calcium hydroxide content.

15. An aggregate including the binder according to claim 1 which includes soil clays mixed in situ making up cementing matrices capable of developing pozzolanic hydraulic reactions forming zeolites and other alumino-silicate cementing materials without the need of providing cement or hydraulic limes.

16. The aggregate including the binder according to claim 1, which includes pozzolans immediately developing pozzolanic hydraulic reactions forming calcium silicate hydrates, calcium aluminate-carbonate hydrates, calcium aluminate hydrates, and/or calcium silicate-aluminate hydrates.

17. The aggregate according to claim 16, wherein the pozzolans have metakaolin and expanded silica at a ratio of 8.5 to 1.5 and the concentration of the carbide lime binder is from 80 to 25% by weight of the dry mixture.

18. The aggregate according to claim 1, which incorporates other hydraulic cementing matrices and contributes to the late hardening of the resulting matrix by air-setting and provides it with ambient $CO_2$ capturing properties provided that the hydraulic matrices do not use additives blocking the pores preventing the permeability to the necessary gases nor do they completely inhibit water absorption.

19. The aggregate according to claim 1, which contains nanometric photocatalytic titanium dioxide (anatase) particles in proportions of 0.3 to 15% by weight of the total weight of the mixture for the formation of slurries, lime paints, stuccos, abrasive layers of pavements and surface coats generally with the capacity for inerting nitrogen oxides and oxidizing hydrocarbon deposits from the contaminated ambient air.

20. The aggregate according to claim 1, wherein the binder should not produce pozzolanic reactions, lignosulfonates can be added as fluidizers up to a maximum of 1.5% with respect to the weight of the dry calcium hydroxide.

21. The binder according to claim 1 which includes an alcohol, forming stable dispersions for use in treatments to restore and conserve historical heritage buildings.

22. A method for purifying and optimizing type A carbide limes of claim 2, wherein the natural degradation of the high reactive capacity of the calcium hydroxide ($Ca(OH)_2$) particles and the $CO_2$ absorption capacity by the step of transforming the calcium hydroxide ($Ca(OH)_2$) into calcium carbonate ($CaCO_3$) is blocked in a preventive manner keeping the residues permanently throughout all the phases of handling in colloidal solution or decanted in the original aqueous solution without contact with the ambient air, using as an isolator the layer of original water floating in the vessels where it is preserved or vacuum-packaged in hermetically closed containers.

23. The method for purifying and optimizing the carbide limes according to claim 22, wherein the calcium hydroxide saturated supernatant solution is removed, transferred and stored in containers connected to one another and to the purification system by means of hermetic ducts to prevent the premature carbonation by airing of the solution.

24. The method for purifying and optimizing the carbide limes according to claim 22, wherein given its capacity to form hydraulic cementing matrices due to the high reactivity associated with the large surface area of calcium hydroxide ($Ca(OH)_2$), the organic carbon present in the carbide lime paste is subjected to an accelerated oxidation process to prevent unwanted interactions in the future pozzolanic reactions.

25. The method according to claim 22, wherein given the presence of sulfides which can generate contaminating or harmful gases (hydrogen sulfide) and sulfites, an accelerated oxidation treatment is performed to transform them into sulfates.

26. The method according to claim 22, wherein the original residues have been exposed to oxidizing substances in ratios of attack equivalent to or greater than that corresponding to a treatment with 10 ml of oxygenated water (hydrogen peroxide ($H_2O_2$)) at 33% vol. for every 100 ml of original residue decanted in containers connected to one another and to the purification system.

27. The method according to claim 22, wherein the original residues have been exposed to an oxidation process by means of bubbling with air in which the $CO_2$ has been previously removed.

28. The method according to claim 22, wherein the air used for bubbling the residues has been in turn obtained by bubbling it through a calcium hydroxide saturated solution, obtained from the supernatant of the carbide limes previously decanted in containers connected to one another and arranged in a sequential manner, until the formation of calcium carbonate precipitate is not observed.

29. The method according to claim 22, wherein the air used for bubbling the residues has been in turn obtained by passing it through a continuous series of vertical curtains of a solution calcium hydroxide saturated solution, obtained from the supernatant of the carbide limes previously decanted in containers arranged in a sequential manner, until the formation of calcium carbonate precipitate is not observed.

30. The method according to claim 22, wherein the air used for bubbling the residues has been in turn obtained by passing it through a tunnel in which a series of sprinklers creates a cloud of micronized droplets of a calcium hydroxide saturated solution, obtained from the supernatant of the carbide limes previously decanted in containers arranged in a sequential manner, until the formation of calcium carbonate precipitate is not observed.

31. The method according to claim 22, wherein the original residues exposed to the oxidation process are treated with barium hydroxide at a concentration equimolar to that of sulfates existing in the carbide lime paste to form, from the sulfates, insoluble anhydride barium sulfate which incorporates and fixes the heavy metals existing in the carbide lime paste in its structure, preventing their future leaching.

32. The method according to claim 22, wherein the original residues are treated with an excess of barium hydroxide to favor the formation of cementing barium carbonate during the air-setting process.

33. A binder according to claim 22, characterized in that it is used for the formation of air and hydraulic cementing matrices with capacity for absorbing ambient $CO_2$ up to the equivalent to 59.4% of the weight of the calcium hydroxide content.

34. An aggregate including the binder according to claim 2 which includes the most common soil clays mixed in situ making up cementing matrices capable of developing pozzolanic hydraulic reactions forming zeolites and other alumino-silicate cementing materials without the need of providing cement or hydraulic limes.

35. The aggregate including the binder according to claim 2, characterized in that it includes pozzolans immediately developing pozzolanic hydraulic reactions forming calcium silicate hydrates, calcium aluminate-carbonate hydrates, calcium aluminate hydrates, and/or calcium silicate-aluminate hydrates.

36. The aggregate according to claim 35, wherein the pozzolans preferably used have metakaolin and expanded silica preferably at a ratio of 8.5 to 1.5 and the concentration of the carbide lime binder is from 80 to 25% by weight of the dry mixture.

37. The aggregate according to claim 2, which incorporates other hydraulic cementing matrices and contributes to the late hardening of the resulting matrix by air-setting and provides it with ambient $CO_2$ capturing properties provided that the hydraulic matrices do not use additives blocking the pores preventing the permeability to the necessary gases nor do they completely inhibit water absorption.

38. The aggregate according to claim 2, which contains nanometric photocatalytic titanium dioxide (anatase) particles in proportions of 0.3 to 15% by weight of the total weight of the mixture for the formation of slurries, lime paints, stuccos, abrasive layers of pavements and surface coats generally with the capacity for inerting nitrogen oxides and oxidizing hydrocarbon deposits from the contaminated ambient air.

39. The aggregate according to claim 2, wherein the binder should not produce pozzolanic reactions, lignosulfonates can be added as fluidizers up to a maximum of 1.5% with respect to the weight of the dry calcium hydroxide.

40. The binder according to claim 2 which includes an alcohol, forming stable dispersions for use in treatments to restore and conserve historical heritage buildings.

41. A $CO_2$ capturing binder comprising calcium hydroxide ($Ca(OH)_2$) in a proportion greater than 75% by weight with respect to the total weight of the components, in primary nanometric formations comprised between 5 nm and 100 nm, with a specific surface area up to 42 $m^2/g$ having mainly disoriented aggregations of micrometric sizes which do not exceed 10 μm, the latter being a mesoporous material with pores in the form of a slit having an average diameter of 25 nm obtained after selecting, purifying and optimizing class A carbide lime residues from the manufacture of acetylene from calcium carbide.

42. The aggregate of claim 15 wherein the soil clays are smectites, kaolinite and illite.

43. The aggregate of claim 34 wherein the soil clays are smectites, kaolinite and illite.

44. The binder according to claim 21 wherein the alcohol is propanol.

45. The binder according to claim 40 wherein the alcohol is propanol.

* * * * *